United States Patent [19]
Schmidt et al.

[11] 3,819,420
[45] June 25, 1974

[54] SMALL AXIAL THERMOCOUPLE

[75] Inventors: Hans Schmidt; Erwin Eggert; Gert Shückle, all of Leopoldshafen, Germany

[73] Assignee: Gesellschaft fur Kernforschung GmbH, Karlsruhe, Germany

[22] Filed: Sept. 24, 1971

[21] Appl. No.: 183,344

[30] Foreign Application Priority Data
Sept. 26, 1970 Germany.......................... 2047539

[52] U.S. Cl................................. 136/228, 136/230
[51] Int. Cl................................................ H01v 1/02
[58] Field of Search .......... 136/224, 225, 226, 228, 136/216, 234, 230; 29/155.5, 573

[56] References Cited
UNITED STATES PATENTS

| | | | |
|---|---|---|---|
| 1,793,529 | 2/1931 | Taylor.................. | 29/423 |
| 2,691,056 | 10/1954 | Wolff.................... | 136/228 X |
| 3,026,363 | 3/1962 | Batteau................. | 136/226 |
| 3,332,808 | 7/1967 | Ray....................... | 136/217 X |
| 3,343,589 | 9/1967 | Holzl.................... | 136/228 X |
| 3,647,560 | 3/1972 | Truppe et al. ........ | 136/234 |
| 3,664,882 | 5/1972 | Hance................... | 136/235 |

FOREIGN PATENTS OR APPLICATIONS

| | | | |
|---|---|---|---|
| 854,570 | 11/1960 | Great Britain ....... | 29/573 |
| 701,314 | 1/1965 | Canada................ | 136/228 |
| 154,454 | 5/1921 | Great Britain ....... | 136/228 |

OTHER PUBLICATIONS
Wagner, Wire and Wire Products, 39, (6), pp. 869–872, (June 1964).

Primary Examiner—Benjamin R. Padgett
Assistant Examiner—E. A. Miller
Attorney, Agent, or Firm—Spencer & Kaye

[57] ABSTRACT

A thermocouple having a cut Taylor which constitutes one leg of the thermocouple. The Taylor wire is coaxially sealed in a glass capillary tube. A metal tube at least partly coaxially encloses the glass capillary tube and constitutes the lead of the other thermoelectric leg. The metal core of the Taylor wire is made of one thermocouple material which is connected with the metal tube by an at least barely electrically conducting layer of the other thermoelectric material, thus constituting the thermoelectrically active measurement junction at the point of contact between the metal core and the layer.

In practice, the glass capillary tube with the Taylor wire coaxially sealed in it may be bent by 90° in the region outside the metal tube.

The above-described thermocouple is made as follows. After the Taylor wire has been sealed in the glass capillary tube, it is bent together with the latter and cut off only afterwards, thus exposing the metal core. The glass capillary tube is sealed in the metal tube. Subsequently, both the thermoelectric measurement junction proper and, at the same time, the connecting lead with the metal tube is made between the metal tube and the front faces of the metal core, by precipitating a thin metal layer of the proper material.

10 Claims, 3 Drawing Figures

PATENTED JUN 25 1974 3,819,420

SMALL AXIAL THERMOCOUPLE

The present invention relates to a thermocouple consisting of a cut Taylor wire constituting one leg of the thermocouple and coaxially sealed in a glass capillary tube, and a metal tube at least partly enclosing the glass capillary tube and constituting the lead of the other thermoelectric leg.

Application of the principle of temperature measurement by thermoelectric means entails the difficulty for the measurement of fast changes of temperature that there is heat transfer to the point of measurement and that the response of the measurement junction proper is insufficient.

The rapidity of a thermocouple responding to a change of temperature and reaching equilibrium temperature in contact with the ambient medium depends on the heat exchange between the environment and the measurement junction and the heat absorption capacity of the measurement junction proper. Considerations of physical events (heat transfer, heat conduction) for optimization of the accuracy and response result in the geometry of the thermocouple. The response of a thermocouple is defined by its time constant, the time $\tau$, in which 63,2 percent of the temperature difference transmitted is indicated.

There are miniature thermocouples (wire thermocouples), generally made through reduction in size of standard components in order to increase the response. However, there are limits in fabrication technology to this method, depending upon the structure of the thermocouple. Usually, sheathed thermocouples are offered with two measurement wires the most frequently used core material being nickel-chromium-nickel. Thermocouples with an insulated measurement junction generally have a diameter of 0.25 mm, those with a non-insulated junction have 0.5 mm diameter. The lowest and optimal time constants attainable are in the range of a few hundredths of a second. It is the purpose of the present invention to create a thermocouple with the corresponding method of fabrication which allows the measurement of very rapid, defined changes of temperature with time constants in the millisecond range. Moreover, media capable of flowing are to ensure accurate flow conditions at the tip of the thermocouple without any eddies or caverns when it comes to the flow around the thermocouple.

In solution of this problem, a base material which presents itself for the thermocouple to be created is the known Taylor wire which will be mentioned in greater detail in the description. According to the invention, the problem is solved in such a way that the metal core of the Taylor wire, which consists of a thermoelectric material, is connected with the metal tube by an at least barely electrically conducting layer of the other thermoelectric material, thus forming the thermoelectrically active measurement junction at the point of contact between the metal core and the layer. The Taylor wire, which is sealed in the glass capillary tube, can at least partly protrude from this tube. Moreover, a preferred embodiment of the invention has the metal core at the open end terminate flush with the quartz glass sheathing of the Taylor wire in the plane of cross section, and a layer having a thickness of a few microns encloses the bare end of the Taylor wire up to the rim of the metal tube, the layer consisting of the evaporated, chemically or electrically precipitated material of the metal tube. In a preferred embodiment of the invention, the glass capillary tube with the Taylor wire coaxially sealed in is bent 90° in the region outside the metal tube. The problem with respect to the method of fabrication of the thermocouples is solved in that the Taylor wire, after having been sealed in the glass capillary tube, is bent together with the latter and cut off afterwards, thus exposing the metal core; the glass capillary tube is sealed in the metal tube and afterwards the thermoelectrics measurement junction proper and, at the same time, the connecting lead with the metal tube is made between the metal tube and the front faces of the metal core by precipitating a thin layer of metal of a proper material.

Further details of the present invention are described below on the basis of FIGS. 1–3.

As mentioned above, the thermocouple according to the invention is based on the so-called Taylor wire. The Taylor wire consists of a very thin metal core sheathed in a thin coating of quartz glass and is made by a special process. In that process, a system consisting of a glass tube with a metal wire inserted is drawn with a large amount of radiation heat being added. The glass tube in this way is turned into a thin hollow glass fiber containing the very thin metal fiber solidified from a liquid melt. Wire diameters of less than 1 $\mu$m can be made in this way.

Figure 1:
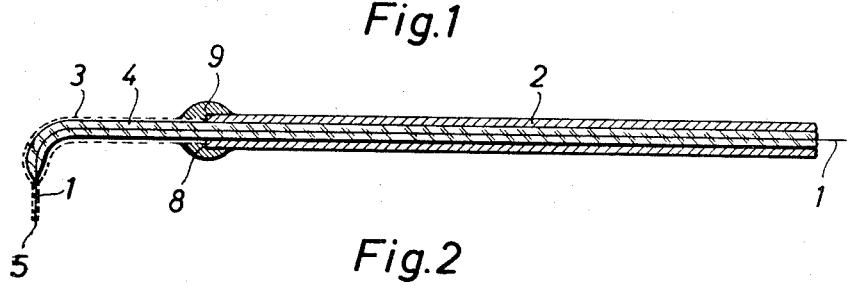
FIG. 1 shows the complete thermocouple in a longitudinal section.
Figure 2:
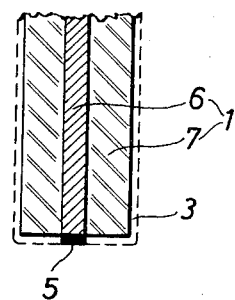
FIG. 2 shows a detail of the measurement tip of the same.

A microwire obtained in this way with a thin sheathing of quartz glass represents the inner conductor of a thermocouple, as shown in FIG. 1 and 2. The Taylor wire 1 consisting of the metal core 6 and the quartz glass sheathing 7 is inserted into a glass capillary tube 4 and sealed in it. The glass capillary tube 4 in turn is inserted into a metal tube 2 and sealed with it. In this design, the Taylor wire 1 protrudes from the glass capillary tube 4 and this in turn, at least partly, protrudes from the metal tube 2. In a special embodiment of the thermocouple for the investigation of vapor bubbles the glass capillary tube 4 with the Taylor wire 1 coaxially sealed in it is bent 90° in the region outside the metal tube 2, e.g., for better detection of rising gas bubbles. The end of the metal tube 2 in the direction facing the tip 5 of the thermocouple is constituted by the rim 8. The tip and measurement junction 5, respectively, of the Taylor wire 1 is formed by a wire plane of cross section in which the metal core 6 terminates flush with the quartz glass sheathing 7 (see FIG. 2). The entire outside of the assembly from the tip 5 to the rim 8 of the metal tube 2 is covered with a barely electrically conducting layer 3 of one thermoelectric material. The metal core 6 of the Taylor wire consists of the other thermoelectric material. This generates an area of a few $\mu$m in diameter of metal core cross section at the tip 5 which is coated with another very thin metal layer of a few $\mu$m. If different thermoelectric materials are used for the metal core 6 and the layer 3, this generates a thermoelectrically active point 5 of a very small mass. The return lead of the thin layer 3 to the corresponding measurement set is constituted by the metal tube 2 which must be made of the same material as the layer 3.

The connection between the metal tube 2 and the layer 3 at the rim 8 can be improved by adding an intermediate contact, layer 9 which can preferably be made, e.g., of a metal powder - epoxy resin solution. The metal layer 3 is added to the quartz glass sheating 7 and the glass capillary tube 4, respectively, preferably by chemical precipitation, cathode sputtering evaporation or spraying. This very thin, still transparent, but at least excellently electrically conducting precipitate is galvanically reinforced, if necessary, at places under stress, such as the bend.

Figure 3:
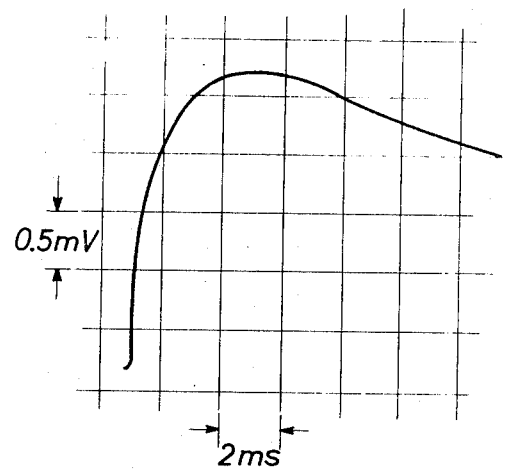
FIG. 3 shows the oscillogram of a measurement recorded with the thermocouple according to the invention.

The good results that can be achieved with a thermocouple according to the invention of the type described above are seen in the picture of an oscillogram shown in FIG. 3. This refers to a thermocouple whose metal core 6 is made of constantan and whose second thermoelectrically active layer 3 is made of silver. The cross section of the metal core is approximately 5 $\mu$m in diameter, and the thickness of the second thermoelectric layer at the tip is some 2 $\mu$m. The curve from FIG. 3 was obtained by dripping hot water on the thermocouple. The retention time of the drop at the tip of the thermocouple of about 5 milliseconds is sufficient to indicate the full temperature difference between the ambient temperature and the drop of water. The time constant of the present thermocouple according to the invention is approximately 1 millisecond. The thermocouple is fabricated by a special method:

First, the Taylor wire 1 is sealed in the glass capillary tube 4. Afterwards, both are bent together. Only then can the Taylor wire be cut off to result in a clean front face with the metal core flush. After sealing the glass capillary tube 4 in the metal tube 2, a very thin layer of metal is precipitated between the metal tube 2 and the front face of the metal core 6, thus generating, on the one hand, the thermoelectric measurement junction 5 proper and, at the same time, the connecting lead with the metal tube 2. The layer is applied preferably first by chemical precipitation followed by galvanic reinforcement. However, all surfaces must be carefully degreased in advance.

A thermocouple according to the invention made by this process solves the problem in an advantageous way:

Under clearly defined flow conditions at the tip, a thermocouple is created whose time constant is on the order of 1 millisecond. This improves the time constant by approximately a factor of 10. It allows the measurement of very fast changes of temperature which may be within very small temperature differences (e.g., investigation of evaporation phenomena). Any geometry of the thermocouple can be achieved by proper bending of the glass capillary tube.

We claim:
1. A thermocouple comprising
    a. a Taylor wire formed of a metal core coated with a glass sheath, said core having a diameter of a few microns; said Taylor wire having an end portion including a cut terminus to expose said core; said core being made of thermoelectric material of a first type;
    b. a glass capillary tube containing said Taylor wire and having a terminal portion, said glass capillary tube being so arranged that said end portion of said Taylor wire protrudes beyond said glass capillary tube;
    c. an electrically conducting metal tube containing and surrounding said glass capillary tube and being so arranged that said terminal portion of said glass capillary tube protrudes beyond said metal tube; and
    d. an electrically conducting coating covering said terminus and contacting said core; said electrically conducting coating being made of a thermoelectric material of a second type; the contact area between said electrically conducting coating and said core constituting the measuring junction of said thermocouple; said electrically conducting coating electrically connecting said core with said metal tube; said metal tube constituting a lead for said electrically conducting coating.

2. A thermocouple as defined in claim 1, wherein said core terminates flush with said sheath whereby said core is exposed solely in cross section.

3. A thermocouple as defined in claim 2, wherein the thickness of said electrically conducting coating over said core has a magnitude of a few microns.

4. A thermocouple as defined in claim 1, wherein said core terminates flush with said sheath whereby said core is exposed solely in cross section; said metal tube having a terminal rim spaced from the end of said glass capillary tube; said electrically conducting coating extending from said terminus of said Taylor wire to said terminal rim of said metal tube.

5. A thermocouple as defined in claim 4, wherein said electrically conducting coating is formed of a material precipitated on said end portion of the Taylor wire protruding beyond said glass capillary tube and on said terminal portion of the glass capillary tube protruding beyond said metal tube.

6. A thermocouple as defined in claim 4, including an intermediate contact layer over said electrically conducting coating and said metal tube in the zone of the terminal rim thereof for improving the contact between said electrically conducting coating and said metal tube.

7. A thermocouple as defined in claim 6, wherein said intermediate contact layer is a solution of metal powder and epoxy resin.

8. A thermocouple as defined in claim 1, wherein at least one part of said terminal portion of said glass capillary tube, together with said Taylor wire contained therein is bent 90° with respect to the length dimension of said metal tube.

9. A thermocouple comprising
    a. a Taylor wire formed of a metal core coated with a glass sheath; said Taylor wire having an end portion including a cut terminus to expose said core; said core being made of thermoelectric material of a first type;
    b. a glass capillary tube containing said Taylor wire and having a terminal portion, said glass capillary tube being so arranged that said end portion of said Taylor wire protrudes beyond said glass capillary tube;
    c. an electrically conducting metal tube containing and surrounding said glass capillary tube and being so arranged that said terminal portion of said glass capillary tube protrudes beyond said metal tube; and d. an electrically conducting coating covering said terminus and contacting said core; said electrically conducting coating being made of a thermoelectric material of a second type; the contact area between said electrically conducting coating and said core constituting the measuring junction of said thermocouple, said contact area having a diameter of a few microns; said electrically conducting coating electrically connecting said core with said metal tube; said metal tube constituting a lead for said electrically conducting coating.

10. A thermocouple as defined in claim 9 wherein said diameter is about 5 microns.

* * * * *